United States Patent Office 3,288,288
Patented Nov. 29, 1966

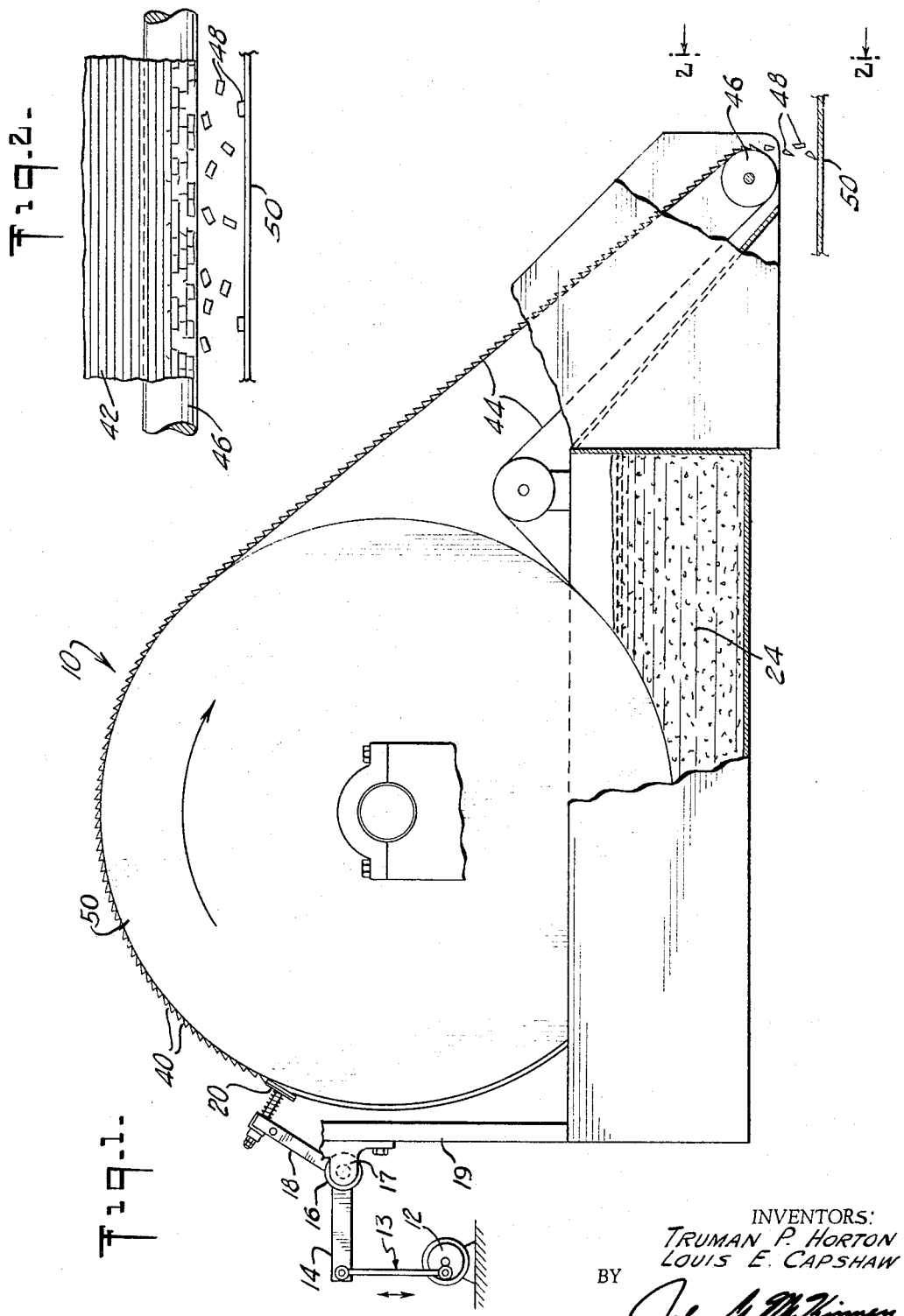

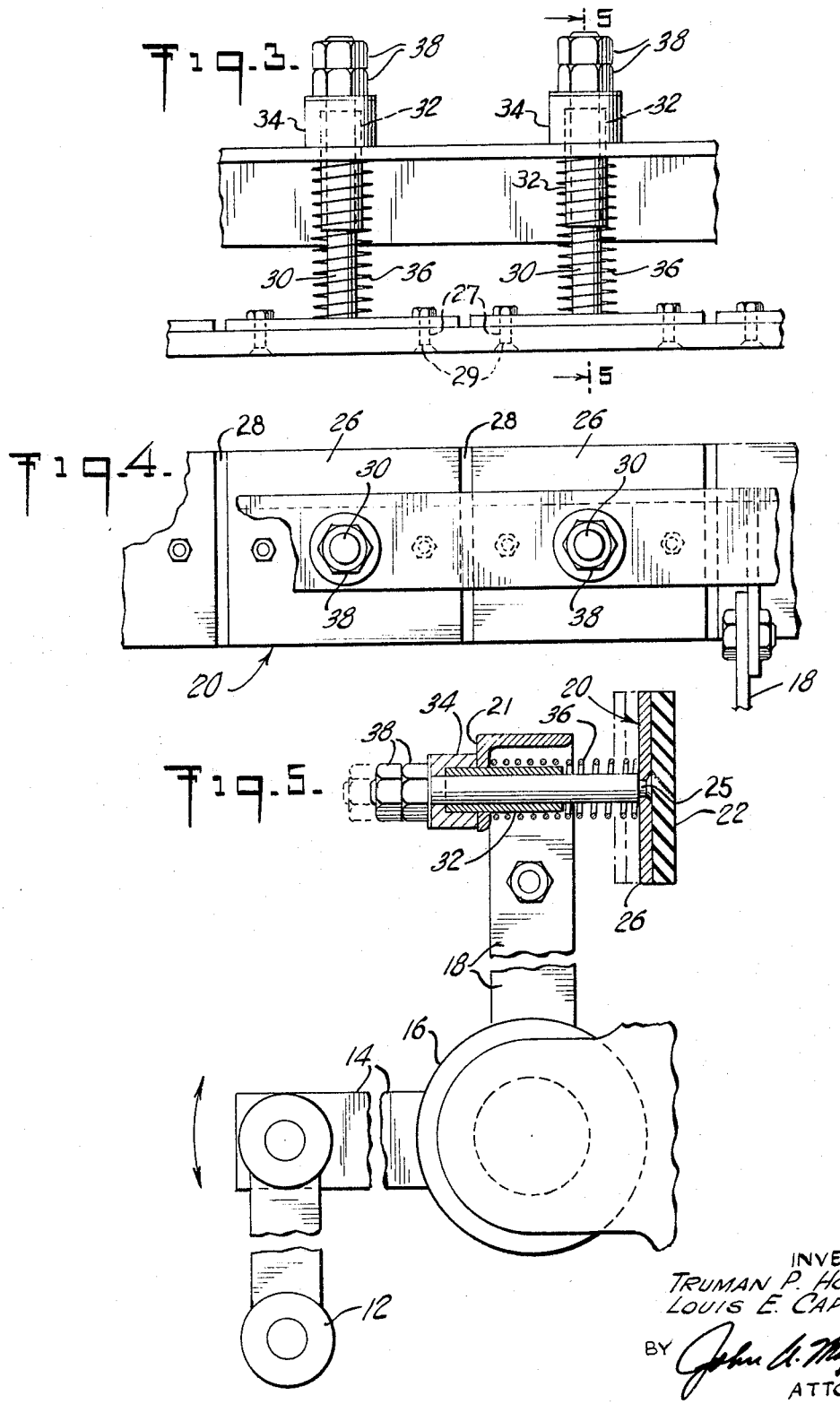

3,288,288
ART OF FILTRATION
Truman P. Horton and Louis E. Capshaw, Lompoc, Calif., assignors to Johns-Manville Corporation, New York, N.Y., a corporation of New York
Filed June 28, 1963, Ser. No. 291,577
3 Claims. (Cl. 210—66)

This invention relates to rotary vacuum filters and particularly to a technique for increasing the amount of water or other liquids removed from slurries during rotary vacuum filtration. The invention also improves the size uniformity of the filter cake chips discharged from the filter. It is particularly adapted for filtration of calcium silicate slurries.

Currently, continuous filtration processes involve the use of a slowly rotating cylinder or drum having a porous filtering medium on its outer surface and means for producing a partial vacuum within the interior of the drum. The drum is generally horizontally mounted so that the lower portion of its periphery revolves within a tank containing a slurry of the material to be recovered by filtration. During a single revolution of the filter, it picks up a coating of slurry, withdraws a portion of the mother liquor, thereby forming a loose cake of the material, moves the cake past washing and compressing means, withdraws the washing liquid from the cake, and removes the cake from the drum immediately before completion of the revolution.

Conventional washing and compressing means comprise a porous belt which is held in pressure contact to travel with the filter cake during a portion of its revolution, and a cooperating source of washing liquid which wets the belt. The liquid is sucked successively through the belt, the filter cake, and the porous filtering medium of the drum. Fabric belts, such as cotton sheeting, have been employed for washing and compacting the filter cake.

Suitable means for reinforcement of the cake and for ultimately stripping it from the drum are also associated with the filter. This arrangement may, for example, comprise a plurality of spaced strings such as illustrated in United States Letters Patent No. 2,197,610 to Fedeler.

The major problems of such filtration techniques have been in facilitating and reducing the cost of subsequent drying operations by achieving sufficient reduction of moisture content of the filter cake, producing uniform cake thickness, and discharging uniformly sized pieces or chips of the cake from the filter.

These problems have been particularly evident in removing water from calcium silicate slurries. The slurry is first filtered on a rotary drum filter, such as described above, to remove the bulk of the water, and the discharged filter cake passed through a drier. Because of the inherent high moisture-retaining property of calcium silicate, rotary vacuum filters have performed poorly. Portions of the filter cake have remained on the filter drum because the cake has not been firm enough to be removed from the filter by the strings. Consequently, these portions form carry-back areas which become thicker with each revolution of the filter drum. When they finally become dislodged they produce what might be termed wet slugs of filter cake which are not completely dried. The drying problem is made more difficult by the varied sized chips discharged from the drum because of the insufficient filtering of the cake.

Various means have been advanced to overcome these problems. Compression rolls have been used to squeeze the cake and reduce cake moisture and are illustrated in Perry's Chemical Engineer's Handbook, Third Edition, page 978, and U.S. Letters Patent Nos. 2,197,610, mentioned above, and 2,564,515 to Vogel. Flappers to slap the cake so as to reduce cake moisture have also been tried. See for instance, Perry, supra, page 991, and U.S. Letters Patent No. 2,735,550 to Fagerberg.

Although these devices have been partially successful, the problems, particularly with regard to calcium silicate slurries, have persisted. None of these above-mentioned devices have improved the reduction of moisture content, nor aided in controlling the size of the chips discharged from the filter.

It is therefore a principal object of the instant invention to provide filter cake compressing means for more efficient and economical rotary filtration.

It is an additional object of this invention to provide means to increase the amount of water and other liquids removed from solids during rotary vacuum filtration and to control the size of the filter cake chips discharged from the filter.

It is another object of this invention to provide a technique to reduce filter cake carry-back in rotary vacuum filtration and to improve the uniformity in filter cake thickness.

It is still a further object to provide a technique of producing more uniform filter cake chips with lower moisture content and thereby increase the efficiency of subsequent drying processes.

It has now been discovered that the foregoing objects may be satisfied and the above-mentioned disadvantages overcome by providing compressing means to impart a serrated profile on the surface of the filter cake through a repeated squeezing action as the filter drum rotates.

Our invention will be more fully understood, and additional objects and further scope of applicability of the present invention will become apparent from the detailed description given hereinafter, the preferred embodiment of which has been illustrated in the accompanying drawings by way of example only, wherein:

FIGURE 1 illustrates a diagrammatic side elevation, shown partially in cross section, of a rotary vacuum filter constructed in accordance with the instant invention;

FIGURE 2 is a partial end view taken along line 2—2 of FIGURE 1 showing the removal of filter cake chips from the strings;

FIGURE 3 is an enlarged detailed view of a portion of the compressing means or tamper head of the instant invention;

FIGURE 4 is an enlarged detailed rear elevation view of the structure shown in FIGURE 3; and FIGURE 5 is an enlarged cross-sectional view of the tamper head taken along line 5—5 of FIGURE 3.

With reference to the drawings, wherein like reference numbers refer to like parts throughout, FIGURE 1 illustrates a rotary vacuum filter 10, comprising a revolvable hollow drum 50 covered with a filter medium and having suitable vacuum producing means (not shown) and a novel compressing means exemplified by tamper 20. The motivating means for the tamper comprises a motor driven eccentric 12 attached by suitable linkage, illustrated generally by reference numeral 13, to a lever arm 14 mounted on and attached rigidly to shaft 16, which is journaled on lugs 17 of the stationary framework 19. A number of arms 18 are attached rigidly to shaft 16 and provide mounting bracket portions 21 for supporting tamper 20 adjacent the external periphery of drum 50. Through the mechanism described, eccentric 12 rocks arms 18 through a limited arc about the axis of shaft 16.

As shown in more detail in FIGURES 3, 4 and 5, the tamper 20 comprises a squeezing strip 22 of a pliable material such as rubber extending continuously across the face of the filter drum 50 and secured at spaced intervals to a plurality of spaced reinforcing metal plates 26 by bolts 27 having their heads countersunk in strip 22, as illustrated at 29. Gaps 28 occur between the ends of metal plates 26. A shaft 30 is attached to each of the metal plates 26, as by a headed fastener 25 (FIG. 5), and is mounted for reciprocation in bushings 32. Bushings 32 are fixed in bracket portions 21 of arms 18. A shock absorbing bushing cup 34 made of suitable resilient material, such as rubber, is fitted about the end of each shaft 30 opposite the end to which the tamper 20 is fixed. The rim end of the bushing cup 34 fits slidingly over bushings 32. Lock nuts 38 retain bushing cup 34 on the end of the shaft. Compression coil spring 36 is coaxial with and surrounds shaft 30 and bushing 32. The ends of each coil spring 36 abut respectively against a bracket portion 21 and metal plate 26, and the springs 36 urge the plates 26 away from the bracket portions 21 and normally cause the rims of bushing cups 34 to abut the bracket portions 21 and the interiors of the bottoms of the cups 34 to abut the ends of bushings 32.

The tamper 20 is mounted at an angle to the tangent to the filter drum with the forward edge, the edge in the direction of rotation, closer to the drum than the backward edge. The individually mounted plates 26 cause the tamper 20 to conform more closely to the surface of the filter cake than it would if it were backed by a continuous bar, since this arrangement permits the rubber strip 22 to flex at local segments along its length.

As the filter drum 10 rotates it draws slurry 24 against its surface forming a filter cake. At the same time eccentric 12 operates through the mechanism described above to cause tamper 20 to impart repeated vibratory action to the filter cake layer and causes the tamper alternately to press down on and then to withdraw from the surface of the filter cake. As the tamper strikes the surface of the cake, shafts 30 are permitted to reciprocate in bushings 32 for a short distance against the action of springs 36, temporarily disengaging the rims of shock absorbing bushing cups 34 from abutment with bracket portions 21. As arms 18 are rocked away from the cake, the bracket portions 21 again abut the rims of cups 34 and tamper 20 is lifted away from the cake, preparatory to another tampering cycle. This squeezing action applied to the surface of the filter cake produces a serrated profile 40 and also works or puddles the cake so as to minimize formation of cracks commonly present with many materials being filtered on rotary drum filters.

As shown in FIGURES 1 and 2, the pressed cake 42 is readily removed from the surface of the filter drum by the conventionally employed strings 44. As the strings pass around the discharge roller 46 the cake is discharged in the form of uniformly sized chips 48 onto conveyor 50, to be carried to a drying oven (not shown).

The following example will illustrate the invention.

*Example*

A conventional rotary drum vacuum string filter eight feet in diameter and ten feet wide was conventionally operated to filter a slurry of calcium silicate. The cake was discharged onto a conveyor belt which carried it through a dryer of conventional design. The cake was soft. Part of the filter cake was discharged from the filter in the form of slabs which tended to fold and break off as they fell onto the conveyor belt. Other parts were discharged as chips varying in size from tiny pieces to large chunks. Still other parts stuck to the filter drum. When these parts made additional passes through the slurry they became thicker and higher in moisture content than the rest of the cake. Finally when they did come free from the filter drum they fell onto the conveyor belt in the form of wet slugs. The bed of filter cake, irregular sized chips and wet slugs, was irregular in thickness and tended to hinder the passage of drying air through it.

The filter cake discharged from the filter averaged 87.3% moisture and 12.7% solids, that is, from each 100 pounds of solids there were 687 pounds of water to be evaporated in the subsequent drying operations.

The tamper, as described above, was then installed on the filter as indicated in FIGURE 1. The rubber strip was ½ inch thick by 4 inches wide and extended across the full ten foot width of the filter. Each metal plate was 4 inches wide and 5 inches long. The plates were spaced ⅜ inch apart. The springs were adjusted by the nuts so that the plate would apply a pressure of 3 to 4 pounds per square inch. The eccentric was rotated at a speed to produce 280 squeezings per minute on the surface of the filter cake with the drum operating at 0.8 r.p.m., and produced a serrated filter cake profile.

The filter cake came free from the filter drum with no carry-back. The cake was relatively uniform in thickness and discharged as chips 1 to 2 inches wide by 2 to 3 inches long. The chips fell onto the conveyor drier belt in a layer of uniform thickness and formed a bed through which the heated drying air could pass much more readily than that of the previous cake.

None of the above-mentioned prior art devices pressed successive small elements of the filter cake to produce a slightly serrated profile which has proven to aid in controlling the size of the chips discharged from the filter.

The chips contained 85.0% moisture and 15.0% solids, so that each 100 pounds of solids contained 567 pounds of water to be evaporated in subsequent drying operations.

Comparing results with respect to moisture content of the filter cake illustrated 17.5% reduction in the moisture to be evaporated by the drier:

|  | Pounds |
|---|---|
| Moisture per 100 lbs. of solids without tamper | 687 |
| Moisture per 100 lbs. of solids with tamper | 567 |
| Reduction per 100 lbs. of solids | 120 |

$$\frac{120}{687} = 17.5\%$$

The relative drying efficiency of the two techniques was evaluated by comparing the needed drier fuel consumption per ton of product. Before the tamper means was installed 22,958 cu. ft. of gas were required as opposed to 20,145 cu. ft. after, or a 12.25% reduction in fuel per ton of product.

Additionally, the use of the tamper has minimized the incidence of wet slugs of filter cake which cause the drying process to go out of control and the product to be rejected because of excess moisture content. The percentage of finished product previously rejected was 2.12% whereas after the installation of the tamper this was reduced to 0.6%.

Operating on maximum throughout, the average filtration rates in tons per 24 hours were 36.397 before the installation of the tamper and 42.778 after, for a net filtration rate increase of 17.53%.

While the instant invention is particularly applicable to rotary vacuum filters employing a string discharge system, it may be used with other rotary filters.

It is believed the above provides a complete description of the invention in such manner as to distinguish it from other inventions and from what is old, and provides a description of the best mode contemplated of carrying out the invention and thereby complies with the patent statutes. It is to be understood that variations and modifications of the invention, as illustrated by the specific example herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:
1. A filtering device comprising a revolvable hollow drum, filter medium covering the drum periphery, means to accommodate a slurry to be filtered positioned to per- mit said drum to be partially contained therewithin, means for creating vacuum within said drum to form a filter cake on the filter medium as the drum revolves through said slurry, substantially flat-surfaced compressing means of substantial width extending the width of said drum, a substantial portion of the total surface of which is capable of contacting the filter cake at an angle to the tangent of the filter drum, and means to actuate said compressing means for imparting a repeated serrated profile to the surface of the filter cake formed on the filter medium of such a nature that the individual serrations extend for substantially the total width of the cake and are substantially contiguous one to another.

2. A filtering device as described in claim 1 wherein said compressing means comprises a continuous flat pliable strip connected to and backed by a plurality of reinforcing plates so as to produce relatively small serrations upon a filter cake which breaks into substantially uniform chips when the cake is discharged.

3. A continuous filtering process comprising forming a filter cake on a revolving filter medium, conditioning said cake by withdrawing a portion of liquid therefrom through the filter medium, subjecting successive portions of the filter cake to repeating compressing action as it revolves by contacting a substantial portion of the total surface of a substantially flat means at an angle to the tangent of said cake and imparting a serrated profile to the surface of the filter cake, whereby the individual serrations extend for substantially the total width of the cake and are substantially contiguous one to another.

References Cited by the Examiner
UNITED STATES PATENTS
2,197,610  4/1940  Fedeler _____ 210—386 X FOREIGN PATENTS
481,037   3/1938   Great Britain.
722,067   1/1955   Great Britain.
739,293  10/1955   Great Britain.

REUBEN FRIEDMAN, *Primary Examiner.*

SAM ZAHARNA, *Assistant Examiner.*